United States Patent
Kuroda et al.

(10) Patent No.: US 7,522,503 B2
(45) Date of Patent: Apr. 21, 2009

(54) INFORMATION RECORDING MEDIUM HAVING FIRST AND SECOND SYNCHRONIZATION SIGNALS RECORDED THEREON, AND INFORMATION REPRODUCING APPARATUS AND METHOD

(75) Inventors: Kazuo Kuroda, Saitama (JP); Toshio Suzuki, Saitama (JP)

(73) Assignee: Pioneer Corporation, Tokyo (JP)

( * ) Notice: Subject to any disclaimer, the term of this patent is extended or adjusted under 35 U.S.C. 154(b) by 704 days.

(21) Appl. No.: 10/890,384

(22) Filed: Jul. 14, 2004

(65) Prior Publication Data

US 2005/0036413 A1 Feb. 17, 2005

(30) Foreign Application Priority Data

Jul. 15, 2003 (JP) .............................. 2003-197094

(51) Int. Cl.
*G11B 7/005* (2006.01)
(52) U.S. Cl. .................................. 369/53.21
(58) Field of Classification Search ........................ None
See application file for complete search history.

(56) References Cited

U.S. PATENT DOCUMENTS

| | | | | |
|---|---|---|---|---|
| 4,631,603 A * | 12/1986 | Ryan | ............................... | 386/9 |
| 4,695,901 A * | 9/1987 | Ryan | ........................... | 380/204 |
| 6,075,761 A * | 6/2000 | Akiyama et al. | ............ | 369/47.4 |
| 6,178,144 B1 * | 1/2001 | Huber | ....................... | 369/13.02 |
| 6,411,585 B1 * | 6/2002 | Kobayashi | ............. | 369/112.01 |
| 7,102,973 B1 * | 9/2006 | Carson | .................... | 369/53.21 |
| 7,196,994 B2 * | 3/2007 | Yamaoka et al. | .......... | 369/53.21 |
| 2002/0172139 A1 * | 11/2002 | Kondo et al. | .............. | 369/275.4 |
| 2002/0181358 A1 * | 12/2002 | Sako | ........................ | 369/47.24 |
| 2003/0147339 A1 * | 8/2003 | Selinfreund et al. | ....... | 369/275.3 |
| 2004/0001414 A1 * | 1/2004 | Kadowaki et al. | ......... | 369/59.24 |

FOREIGN PATENT DOCUMENTS

JP 2003-85896 3/2003

* cited by examiner

*Primary Examiner*—Michael V Battaglia
(74) *Attorney, Agent, or Firm*—Drinker Biddle & Reath LLP

(57) ABSTRACT

On an optical disc, a record mark having a variable length according to pit data DP is formed at a displaced position to which the record mark is displaced, in a direction crossing the reading direction thereof, according to a wobble signal WB obtained by modulating wobble data DW in a predetermined modulating method. A second wobble synchronization signal D-SYNCw, as a dummy, is recorded on the optical disc, away from the start position of the wobble data DW.

8 Claims, 12 Drawing Sheets

FIG. 7

| BIT POSITION | RECORD CONTENT |
| --- | --- |
| 0 - 15 | Sync Pattern |
| 16 - 17 | Encryption Pattern Number |
| 18 - 23 | Relative Sync Positon |

INFORMATION RECORDING MEDIUM HAVING FIRST AND SECOND SYNCHRONIZATION SIGNALS RECORDED THEREON, AND INFORMATION REPRODUCING APPARATUS AND METHOD

BACKGROUND OF THE INVENTION

1. Field of the Invention

The present invention relates to an information recording medium, such as an optical disc, and an apparatus for and a method of reproducing information from the information recording medium.

2. Description of the Related Art

In an optical disc represented by a Compact Disc (CD) and a DVD, the long or short length of a pit is used to record information. However, in order to record information for copy control for the prevention of illegal copying or the like, there is a request for reserving another recording area without decreasing a recording capacity by the pit.

As a method of increasing the recording capacity by other means except the method using the long or short length of the pit, there is known a technique of displacing or shifting the position of the pit in the radial direction of the optical disc. This technique is such that information is recorded by wobbling the position of the pit in the radial direction of the optical disc and by performing spread spectrum with respect to the wobble (e.g. Japanese Patent Application Laying Open NO. 2003-85896).

This technique is such as to append a synchronization signal to predetermined data including the information for copy control, perform spread spectrum with respect to this data by using random data to thereby generate a wobble signal, and wobble the position of a record mark according to the wobble signal. In this case, since the wobble is spread in spectrum, it is possible to increase the concealment of the predetermined data to some extent.

The synchronization signal has a particular data pattern and is appended to the predetermined data with a constant cycle. Therefore, there is the possibility that the wobble signal is reproduced from the optical disc and that the synchronization signal with the particular data pattern is detected from the reproduced wobble signal. This causes the problem that the predetermined data is reproduced by using the synchronization signal as a clue and that it is impossible to ensure the concealment of the information for copy control associated with information about copyright or the like.

SUMMARY OF THE INVENTION

It is therefore an object of the present invention to provide an information recording medium which ensures the concealment of the recorded information for copy control, as well as an apparatus for and method of reproducing the information from the information recording medium, as one example.

The present invention will be explained hereinafter. An information recording medium of the present invention may be disc-shaped and may comprise various optical discs, such as a CD, a Compact Disc-Read Only Memory (CD-ROM), a DVD, and a DVD-ROM, for example.

The above object of the present invention can be achieved by an information recording medium on which a record mark having a variable length according to first data is formed at a displaced position to which the record mark is displaced, in a direction crossing a reading direction of the record mark, according to a signal obtained by modulating second data in a predetermined modulating method, wherein a second synchronization signal as a dummy is recorded away from a start position of the second data.

According to the information recording medium of the present invention, the record mark is formed along a circular track as a pit on the information recording medium, for example. The first data is recorded according to the variable length (i.e. the long or short length) of the record mark. The track, in close-up, meanders or wobbles in the direction crossing a reading direction. The meandering or wobbling of the track is referred to as the "wobble" and has a shape corresponding to a signal (i.e. the wobble signal). The wobble signal can be obtained by modulating the second data in the predetermined modulating method. In other words, the record mark is formed at the displaced position to which it is displaced, in the direction crossing the reading direction, according to the wobble signal.

On the information recording medium, the second synchronization signal as a dummy is recorded away from the start position of the second data. Thus, with respect to the second data recorded on the information recording medium, illegal copy vendors who do not know a position at which the synchronization signal is placed have difficulty in detecting the synchronization signal from the second data. As a result, it is difficult to reproduce the second data from the information recording medium, so that it is possible to greatly improve the concealment of the second data. Particularly, if the information for copy control for the prevention of illegal copying or the like is adopted, it is possible to effectively forbid illegal copying.

In one aspect of the information recording medium of the present invention, a first synchronization signal which is synchronized with a synchronization signal of the first data is recorded at a predetermined position of the second data.

According to this aspect, it is possible to easily reproduce the second data by detecting the synchronization signal of the first data. On the other hand, it is difficult to detect the first synchronization signal from the second data for illegal copy vendors who do not know that the first synchronization signal which is synchronized with the synchronization signal of the first data is placed at the predetermined position of the second data.

In this aspect, it may be constructed such that the first synchronization signal is encrypted and recorded, and the second synchronization signal includes (i) first information associated with an encryption of the first synchronization signal and (ii) second information for indicating a recording position of the first synchronization signal.

By constructing in this manner, in order to reproduce the second data, it is necessary to detect the second synchronization signal from the information recording medium and further to decrypt or decode the first synchronization signal on the basis of the information included in the second synchronization signal. Therefore, it is more difficult to detect the first synchronization signal from the second data, so that it is possible to further improve the concealment of the second data.

In this case, it may be further constructed such that the first synchronization signal is encrypted by using a predetermined random series or a predetermined encryption table, and that the first information associated with the encryption is a random series number for indicating the predetermined random series or an encryption table number for indicating the predetermined encryption table.

By constructing in this manner, it is possible to use the random series number of the encryption table number as a "key" to decrypt or decode the encryption of the first wobble synchronization signal. As a result, it is possible to easily reproduce the second data.

In another aspect of the information recording medium of the present invention, the second synchronization signal includes position information for indicating a recording position of one portion of the second data to be placed at a position at which the synchronization signal is placed.

According to this aspect, the reproduction of the second data is to be performed by referring to the position information, specifying the second data from the wobble data, and replacing the recording positions of one portion of the specified second data and the second synchronization signal with each other. Therefore, it becomes more difficult to reproduce the second data, and it is possible to further improve the concealment of the second data.

In another aspect of the information recording medium of the present invention, the predetermined modulating method is a spread spectrum modulating method.

According to this aspect, even if the wobble signal is reproduced from the information recording medium, it only looks like a noise because of the spread spectrum, so that it is possible to further improve the concealment of the predetermined information.

The above object of the present invention can be also achieved by an information reproducing apparatus for reproducing information recorded on the above-described information recording medium (including its various aspects), the information reproducing apparatus provided with: a reading device for reading the record mark recorded on the information recording medium; a wobble signal generating device for generating a wobble signal for indicating the displaced position of the record mark on the basis of an output signal from the reading device; a second data reproducing device for reproducing the second data from the generated wobble signal; and a synchronization signal removing device for removing the second synchronization signal from the reproduced second data.

According to the information reproducing apparatus of the present invention, it reproduces the second data from the above described information recording medium of the present invention. On the information recording medium, the record mark having a variable length (i.e. a long or short length) according to the first data is formed at a displaced position to which the record mark is displaced, in a direction crossing a reading direction of the record mark, according to a signal obtained by modulating the second data in a predetermined modulating method. The second synchronization signal as a dummy is recorded away from the start position of the second data.

The information reproducing apparatus is provided with: the reading device; the wobble signal generating device; the second data reproducing device; and the synchronization signal removing device. The reading device reads the record mark recorded on the information recording medium. Then, the wobble signal generating device generates a wobble signal for indicating the displaced position of the record mark on the basis of an output signal from the reading device. Then, second data reproducing device reproduces the second data from the generated wobble signal. Then, the synchronization signal removing device removes the second synchronization signal from the reproduced second data.

On the information reproducing apparatus, it is possible to easily reproduce the actual data by that the synchronization signal removing device removes the second synchronization signal from the second data, while it is possible to effectively forbid illegal copying.

In one aspect of the information reproducing apparatus, a first synchronization signal which is synchronized with a synchronization signal of the first data and which is encrypted is recorded at a predetermined position of the second data on said information recording medium, and the second synchronization signal includes (i) first information associated with an encryption of the first synchronization signal and (ii) second information for indicating a recording position of the first synchronization signal, and the information recording apparatus is further provided with: a second synchronization signal detecting device for detecting the second synchronization signal from the reproduced second data; and a first synchronization signal detecting device for extracting the first information and the second information from the detected second synchronization signal, separating the encrypted first synchronization signal included in the second data on the basis of the extracted second information, and decrypting the encrypted first synchronization signal by using the first information, to thereby detect the first synchronization signal.

According to this aspect, it is possible to certainly reproduce the actual data.

In another aspect of the information reproducing apparatus, the second synchronization signal includes position information for indicating a recording position of one portion of the second data to be placed at a position at which the synchronization signal is placed, and the information reproducing apparatus is further provided with: a replacing device for returning the second data to a normal position on the basis of the position information.

According to this aspect, it is possible to certainly reproduce the actual data.

The above object of the present invention can be also achieved by an information reproducing method of reproducing information recorded on the above-described information recording medium (including its various aspects), the information reproducing method provided with: a reading process of reading the record mark recorded on the information recording medium; a wobble signal generating process of generating a wobble signal for indicating the displaced position of the record mark on the basis of an output signal in the reading process; a second data reproducing process of reproducing the second data from the generated wobble signal; and a synchronization signal removing process of removing the second synchronization signal from the reproduced second data.

According to the information reproducing method, in the same manner as the above described information reproducing apparatus of the present invention, it is possible to easily reproduce the actual data by that the synchronization signal removing process removes the second synchronization signal from the second data while it is possible to effectively forbid illegal copying.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 7 is an explanatory diagram showing the data format of a second wobble synchronization signal associated with a second embodiment of the present invention;

DETAILED DESCRIPTION OF THE PREFERRED EMBODIMENTS

The preferred embodiments of the present invention will be explained with reference to the drawings hereinafter.

1. First Embodiment

<1-1. Basic Structure of Optical Disc>

Figure 1:
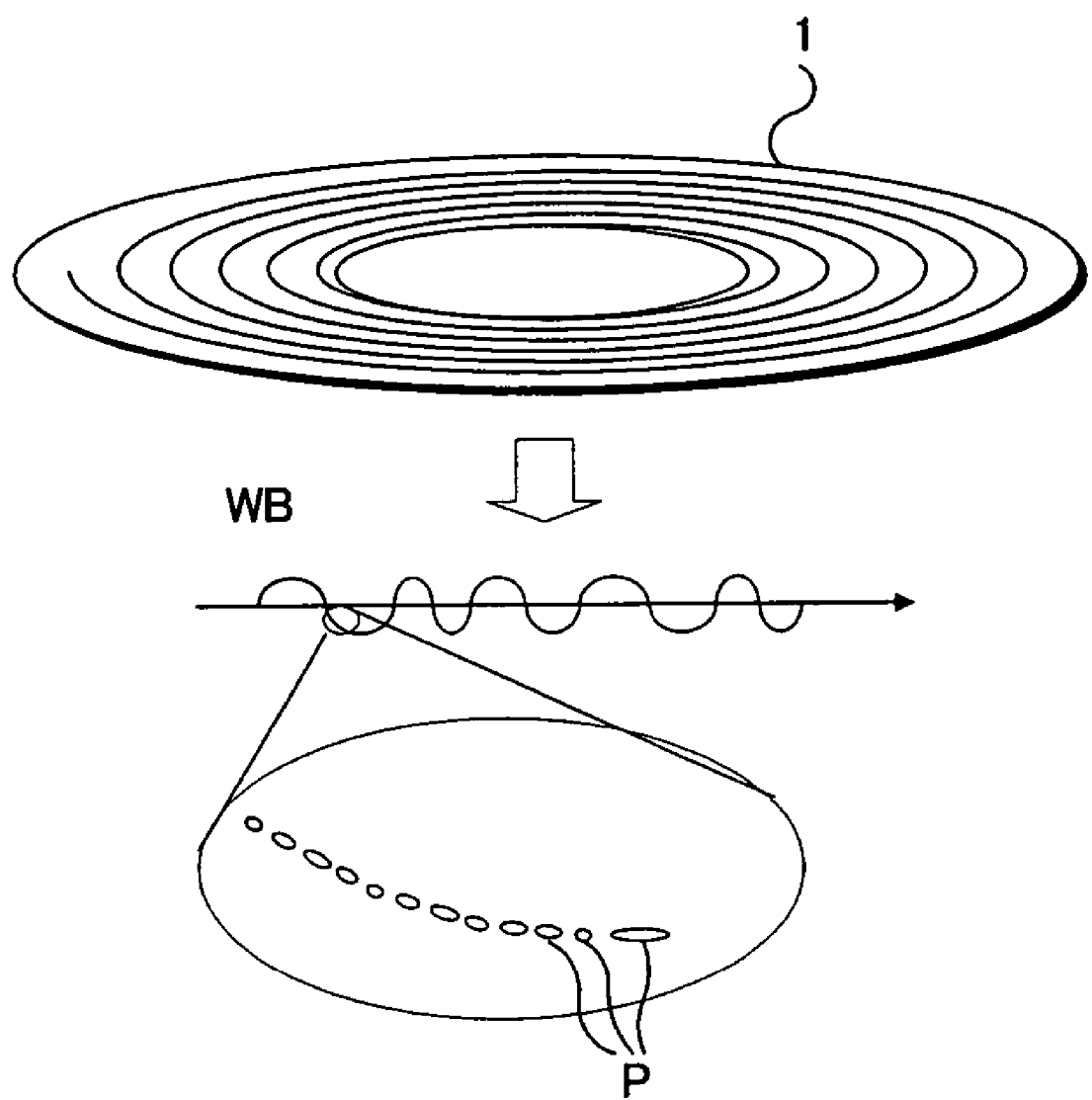
FIG. 1 is an explanatory diagram showing tracks formed on a master disc DS.

In the first embodiment, a DVD is taken and explained as one example of the information recording medium, but it is to be understood that the present invention is not limited to the first embodiment. FIG. 1 shows tracks formed on an optical disc 1. On the optical disc 1, record marks are formed along circular tracks as pits P. Pit data DP is recorded according to the variable length (i.e. the long or short length) of the record mark. The track, in close-up, meanders or wobbles in the direction crossing a reading direction. The meandering or wobbling of the track is referred to as the "wobble" and has a shape corresponding to a wobble signal WB. The wobble signal WB is generated on the basis of wobble data DW. Namely, in addition to the pit data DP, the wobble data DW is superposedly or redundantly recorded by the meandering or wobbling of the record mark on the optical disc 1. The pit data DP has image and audio information or the like, and the wobble data DW has management information about copyright, such as copy information. Incidentally, the pit data DP corresponds to the above-described "first data", and the wobble data DW corresponds to the above-described "second data".

Figure 2:
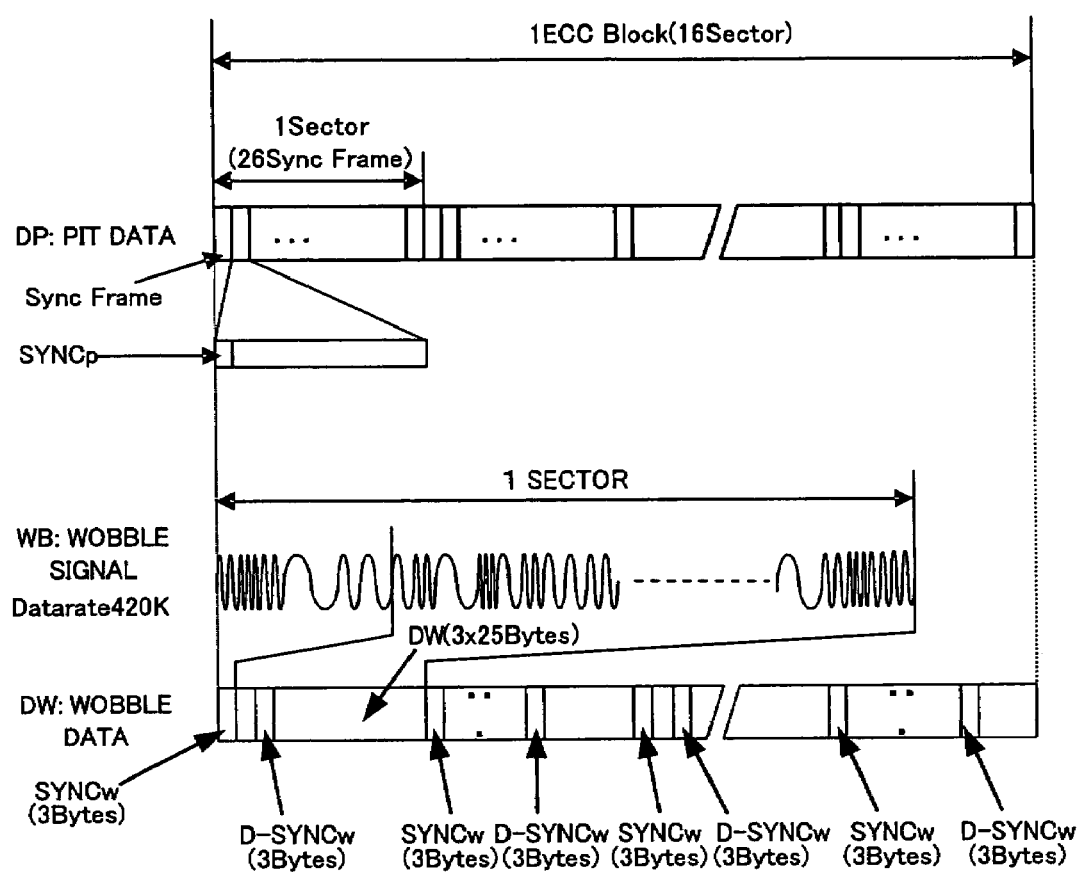
FIG. 2 is an explanatory diagram showing the data formats of pit data DP and wobble data DW associated with a first embodiment of the present invention.

FIG. 2 shows the data formats of the pit data DP and the wobble data DW. In the first embodiment, the data unit of the pit data DP to'which an error-correcting code is appended is referred to as an ECC block. As shown in FIG. 2, one ECC block includes 16 sectors, and one sector includes 26 synchronization frames. A pit synchronization signal SYNCp is placed at the head of the synchronization frame. Correspondingly to one sector of the pit data DP, 3 bytes of a first wobble synchronization signal SYNCw is provided for one sector of the wobble data DW which is 3×25 bytes. The start position of the wobble data DW is defined by the head of the sector. As shown in FIG. 2, the first wobble synchronization signal SYNCw is placed at the head of each sector of the wobble data DW. Namely, the first wobble synchronization signals SYNCw are inserted to the wobble data DW at constant intervals.

As shown in FIG. 2, a second wobble synchronization signal D-SYNCw, which is one dummy synchronization signal, is provided for each sector of the wobble data DW. Incidentally, a plurality of second wobble synchronization signals D-SYNCw may be provided for each sector. At least a synchronization discrimination signal pattern of the second wobble synchronization signal D-SYNCw is the same as that of the first wobble synchronization signal SYNCw. With respect to a recording area for the wobble data DW on the optical disc 1, the second wobble synchronization signal D-SYNCw is recorded at a different position from the position of the first wobble synchronization signal SYNCw. The relative recording position of the second wobble synchronization signal D-SYNCw with respect to the first wobble synchronization signal SYNCw on the optical disc 1 preferably differs for each second wobble synchronization signal D-SYNCw and is irregular. Incidentally, the first wobble synchronization signal SYNCw corresponds to the above-described "first synchronization signal", and the second wobble synchronization signal D-SYNCw corresponds to the above-described "second synchronization signal".

As described above, in the first embodiment, the second wobble synchronization signal D-SYNCw is inserted into and provided for the wobble data DW, but the second wobble synchronization signal D-SYNCw itself is independent of the wobble data DW. Namely, the second wobble synchronization signal D-SYNCw can be regarded as the dummy synchronization signal of the first wobble synchronization signal SYNCw.

In the first embodiment, the first wobble synchronization signal SYNCw is synchronized with the pit synchronization signal SYNCp provided for the pit data DP. Thus, even if illegal copy vendors who do not know about the regular or constant cycle of the first wobble synchronization signal SYNCw described above try to reproduce the wobble data DW from the optical disc 1, they have difficulty in judging which is a true synchronization signal, the first wobble synchronization signal SYNCw or the second wobble synchronization signal D-SYNCw. Therefore, according to the first embodiment, it is possible to improve the concealment of the wobble data DW.

<1-2. Entire Structure of Mastering Apparatus>

Figure 3:
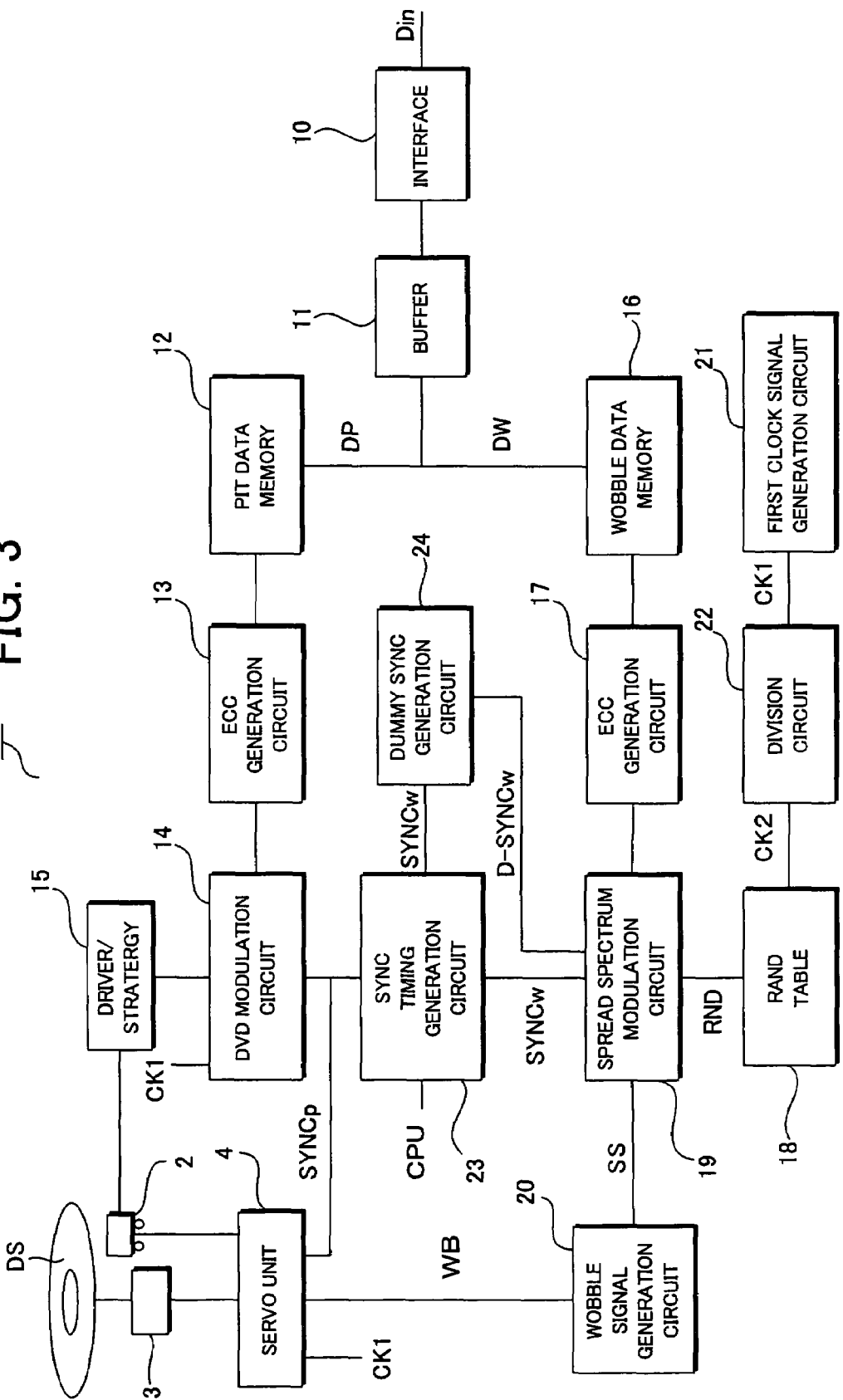
FIG. 3 is a block diagram showing the entire structure of a mastering apparatus associated with the first embodiment of the present invention.

FIG. 3 shows the entire structure of a mastering apparatus. A mastering apparatus 100 is intended to make a master disc DS for the optical disc 1 and is provided with: a recording unit 2; a spindle motor 3 for rotating the master disc DS; and a servo unit 4. The master disc DS is made as a glass master on which photoresist is applied, for example. The recording unit 2 is provided with: a laser diode for irradiating laser light; an optical system for focusing the laser light on the master disc DS; and a slider apparatus for moving the laser diode and the optical system as one body in the radial direction of the master disc DS. The laser diode emits the laser light with a power corresponding to a driving signal supplied from a driver 15. The slider apparatus moves the optical system and the laser diode in the radial direction of the master disc DS according to a control signal from the servo unit 4.

A first clock signal CK1 and the pit synchronization signal SYNCp are supplied to the servo unit 4. In synchronization with these signals, the servo unit 4 performs spindle servo for controlling the rotation of the spindle motor 3, focus servo for controlling the focus of the laser light, and slide servo for controlling the slider apparatus. In the slide servo out of them, the control signal is generated by adding a wobble signal WB to a signal for forming a spiral track, and the slider apparatus is controlled by the control signal.

The first clock signal CK1 is generated by a first clock signal generation circuit 21. In the first embodiment, the frequency of the first clock signal CK1 is 10.5 MHz. The first clock signal CK1 is a time reference for the pit data DP. A division circuit 22 frequency-divides the first clock signal CK1 and generates a second clock signal CK2 or the like. The frequency of the second clock signal CK2 is 420 KHz. The second clock signal CK2 is used for the generation of the wobble signal WB and is a time reference for it.

The input data Din is supplied from external equipment to the mastering apparatus 100. The input data Din is taken into a buffer 11 through an interface 10. The input data Din taken into the buffer 11 is divided into the pit data DP and the wobble data DW under the control of a Central Processing Unit (CPU), and they are transferred to a pit data memory 12 and a wobble data memory 16, respectively.

The CPU reads the pit data DP from the pit data memory 12 and supplies it to an Error-Correcting Code (ECC) generation circuit 13. After scrambling in which the data order of the pit data DP is rearranged according to a preset rule, the ECC generation circuit 13 generates an error-correcting code and appends it to the pit data DP. A DVD modulation circuit 14 generates the pit data DP by modulating the output data of the ECC generation circuit 13. The pit synchronization signal SYNCp generated on a SYNC timing generation circuit 23 is appended to the pit data DP.

In the meantime, the wobble data DW stored in the wobble data memory 16 is read from there and supplied to an ECC generation circuit 17 under the control of the CPU. After scrambling in which the data order of the wobble data DW is rearranged, the ECC generation circuit 17 appends an error-correcting code generated on the basis of the wobble data DW.

A random pattern used for spread spectrum is stored on a RAND table 18. The random pattern corresponds to a spread code and is a bit row generated by using a random function. The second clock signal CK2 is supplied to the RAND table 18. The random pattern is read in synchronization with the second clock signal CK2. The read random pattern is supplied to a spread spectrum modulation circuit 19 as random data RND.

The SYNC timing generation circuit 23 generates the first wobble synchronization signal SYNCw. A dummy SYNC generation circuit 24 generates the second wobble synchronization signal D-SYNCw according to a predetermined rule. Specifically, the dummy SYNC generation circuit 24 generates the second wobble synchronization signal D-SYNCw at a timing which is delayed by a random time length from a timing at which the first wobble synchronization signal SYNCw is generated.

The spread spectrum modulation circuit 19 appends the first wobble synchronization signal SYNCw to the wobble data DW on the basis of the timing at which the SYNC timing generation circuit 23 generates the first wobble synchroniza-tion signal SYNCw, and appends the second wobble synchronization signal D-SYNCw to the wobble data DW on the basis of the timing at which the dummy SYNC generation circuit 24 generates the second wobble synchronization signal D-SYNCw.

The spread spectrum modulation circuit 19 multiplies the wobble data DW to which the first and second wobble synchronization signals SYNCw and D-SYNCw are appended with the random data RND, to thereby generate the spread spectrum data SS. The spread spectrum modulation circuit 19 can be constructed from an eXclusive OR (XOR) circuit, for example.

A wobble signal generation circuit 20 generates the wobble signal WB by band-limiting the spread spectrum data SS. In this case, the wobble signal generation circuit 20 can be constructed from a band pass filter, a low pass filter, or the like, for example.

The master disc DS on which the record mark is formed by the mastering apparatus 100 is developed to be a resist master. After that, one metal master is made through an electroforming process of plating on the basis of the resist master, and then a plurality of mothers are made from the one metal master. Furthermore, a plurality of stampers are made from the plurality of mothers. The optical disc 1 is produced by pressing resin, such as plastic, by using the stamper.

<1-3. Information Reproducing Apparatus>

Figure 4:
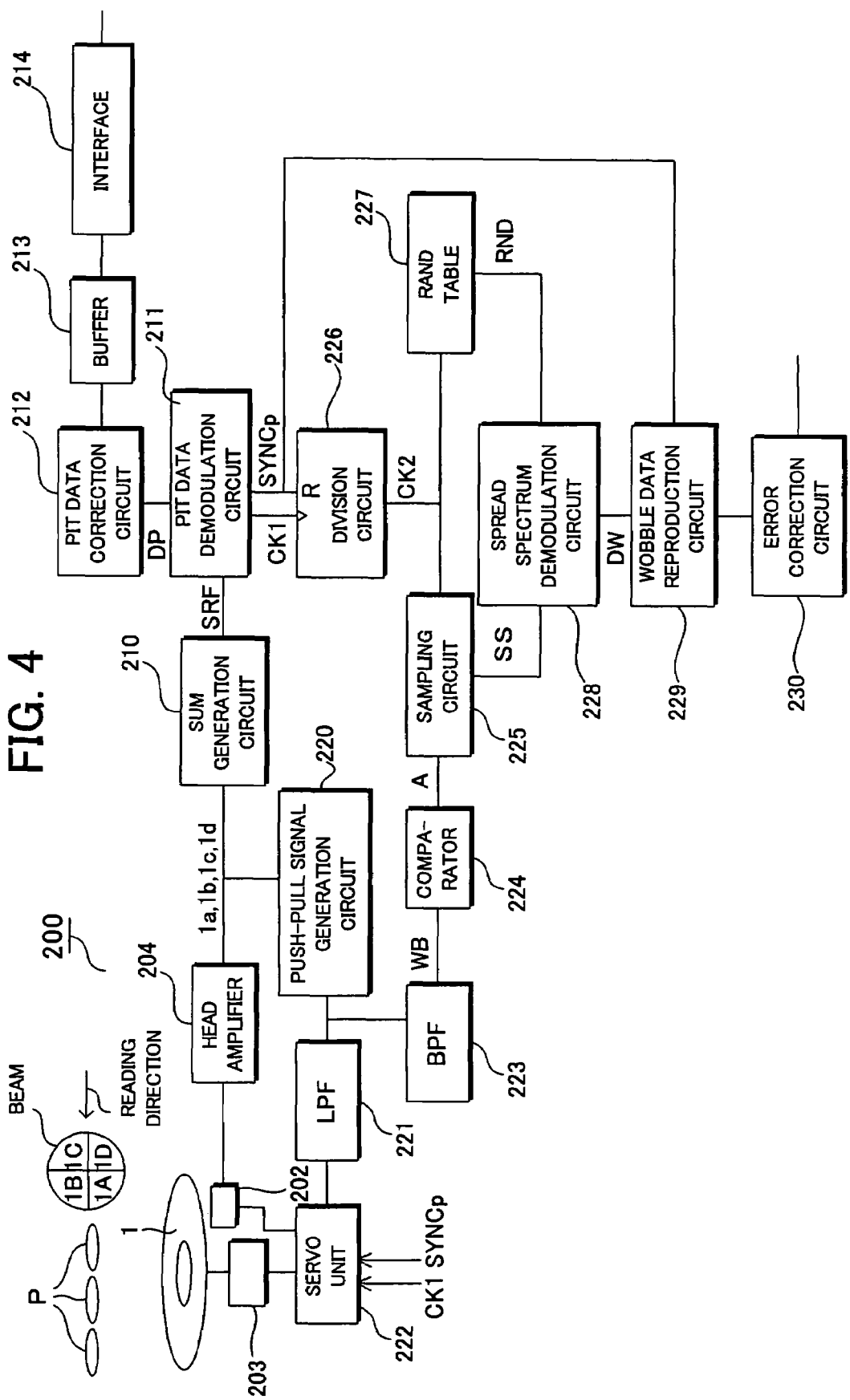
FIG. 4 is a block diagram showing the entire structure of an information reproducing apparatus associated with the first embodiment of the present invention.

Next, the information reproducing apparatus will be explained. FIG. 4 shows the entire structure of an information reproducing apparatus 200.

The information reproducing apparatus 200 is provided with: an optical pickup 202 for irradiating a reproduction beam onto the optical disc 1, which is the information recording medium, and for outputting a signal corresponding to reflected light; a spindle motor 203 for controlling the rotation of the optical disc 1; and a servo unit 222. The first clock signal CK1 and the pit synchronization signal SYNCp are supplied to the servo unit 222. In synchronization with these signals, the servo unit 222 performs spindle servo for controlling the rotation of the spindle motor 203 and focus servo and tracking servo for controlling the relative position of the optical pickup 202 with respect to the optical disc 1.

The optical pickup 202 is provided with: a laser diode for irradiating the reproduction beam; and a four-division detection circuit (not-illustrated). The four-division detection circuit divides by 4 the reflected light of the reproduction beam into areas 1A, 1B, 1C, and 1D shown in FIG. 4, and outputs each signal corresponding to the quantity of light in respective one of the areas. A head amplifier 204 amplifies each output signal of the optical pickup 202, and outputs a divisional read signal $1a$ corresponding to the area 1A, a divisional read signal $1b$ corresponding to the area 1B, a divisional read signal $1c$ corresponding to the area 1C, and a divisional read signal $1d$ corresponding to the area 1D. Incidentally, the optical pickup 202 and the head amplifier 204 correspond to the "reading device" described above.

A sum generation circuit 210 is constructed from an addition circuit for adding the divisional read signals $1a$, $1b$, $1c$, and $1d$ and for outputting a sum read signal SRF. Incidentally, the sum read signal SRF represents the length of the record mark.

A pit data demodulation circuit 211 reproduces the pit data DP and generates the first clock signal CK1 on the basis of the sum read signal SRF.

Figure 5:
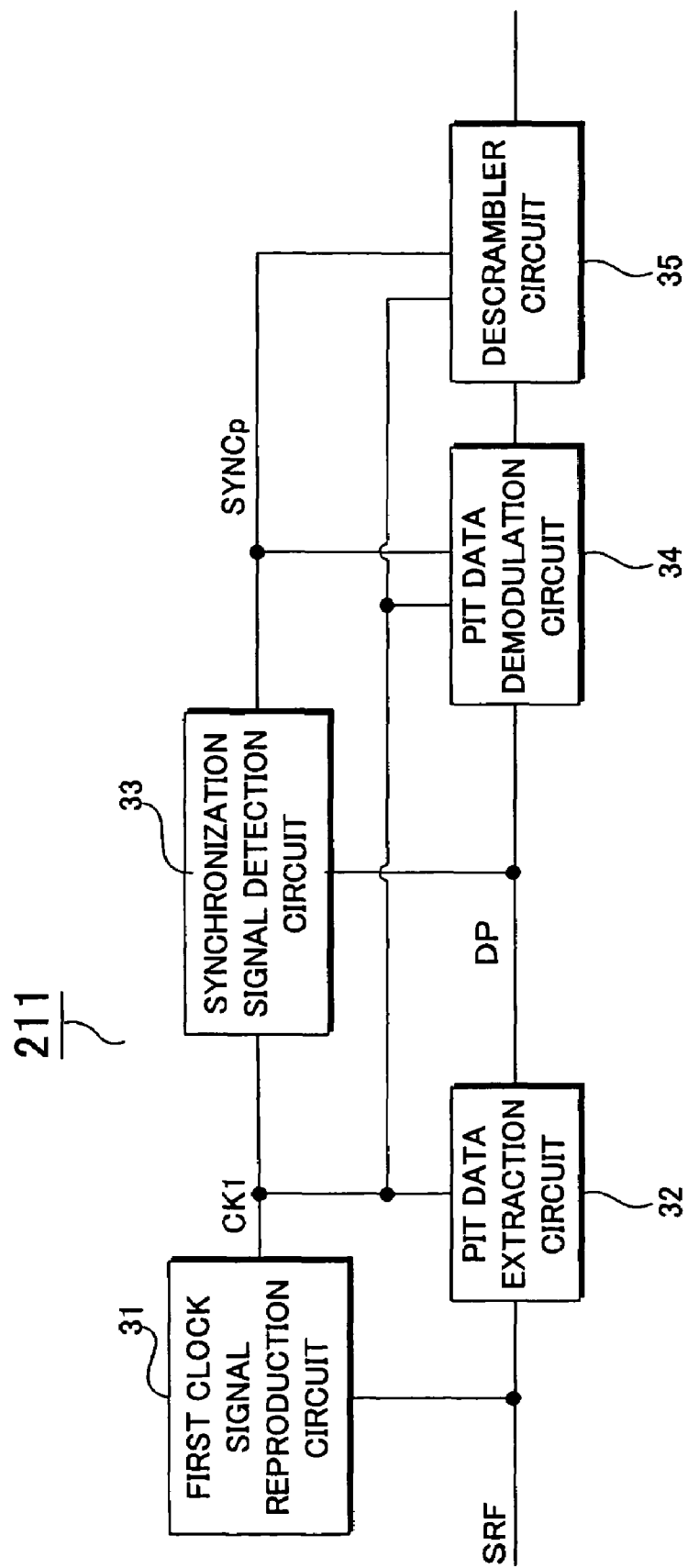
FIG. 5 is a block diagram showing the structure of a pit data demodulation circuit of the information reproducing apparatus.

FIG. 5 shows the structure of the pit data demodulation circuit 211. As shown in FIG. 5, the pit data demodulation circuit 211 is provided with: a first clock signal reproduction circuit 31; a pit data extraction circuit 32; a synchronization signal detection circuit 33; a pit data demodulation circuit 34; and a descrambler circuit 35.

The first clock signal reproduction circuit 31 reproduces the first clock signal CK1 synchronized with the pit data DP on the basis of the sum read signal SRF. The pit data extraction circuit 32 samples, with the first clock signal CK1, a binary signal obtained by binarizing the sum read signal SRF and reproduces the pit data DP.

The synchronization signal detection circuit 33 detects a synchronization pattern included in the reproduced pit data DP and generates the pit synchronization signal SYNCp. The synchronization pattern is a particular data pattern which is not included in other pit data, and has a constant cycle. The pit synchronization signal SYNCp indicates the timing of the synchronization pattern.

The pit data demodulation circuit 34 generates reproduction data by demodulating the reproduced pit data DP with a predetermined table, with the pit synchronization signal SYNC being as a reference position. For example, if Eight to Sixteen Modulation (8-16 modulation) is used as a modulating method, the demodulation processing is performed in which 16 bits of the pit data DP is converted into 8 bits of the reproduction data. The descrambler circuit 35 performs descrambling in which the order of the reproduction data is rearranged according to a preset rule, and outputs the processed reproduction data.

The reproduction data obtained in this manner is supplied to a pit data error correction circuit 212 shown in FIG. 4, and after error correcting and interpolating therein, it is stored into a buffer 213. An interface 214 sequentially reads the data stored in the buffer 213, converts it into a predetermined output form, and outputs it to an external equipment.

Back in FIG. 4, the explanation goes on. A push-pull signal generation circuit 220 calculates $(1a+1d)-(1b+1c)$ and generates a push-pull signal. The component $(1a+1d)$ corresponds to the areas 1A and 1D which are on the left side with respect to the reading direction, while the component $(1b+1c)$ corresponds to the areas 1B and 1C which are on the right side with respect to the reading direction. Namely, if the reproduction beam inclines to the left side with respect to the pit, the push-pull signal will have positive polarity with the amplitude center thereof as a standard. If the reproduction beam is positioned in the center of the pit, the value of the push-pull signal will be in the amplitude center thereof. If the reproduction beam inclines to the right side with respect to the pit, the push-pull signal will have negative polarity with the amplitude center thereof as a standard. The relative position between the reproduction beam and the pit changes according to the meandering or wobbling of the track, and the value of the push-pull signal represents the relative position between the reproduction beam and the pit. Namely, the push-pull signal is a signal corresponding to the meandering or wobbling of the track.

The push-pull signal is outputted through a low pass filter 221 to the servo unit 222. The servo unit 222 performs tracking control on the basis of the push-pull signal. Moreover, the push-pull signal is supplied to a band pass filter 223. The pass band of the band pass filter 223 is set to extract the wobble signal WB obtained by the spread spectrum modulation of the wobble data DW upon recording from the push-pull signal. Therefore, the band pass filter 223 constitutes the "wobble signal generating device" described above with the push-pull signal generation circuit 220, and the output signal of the band pass filter 223 is such as to reproduce the wobble signal WB from the optical disc 1.

Figure 6:
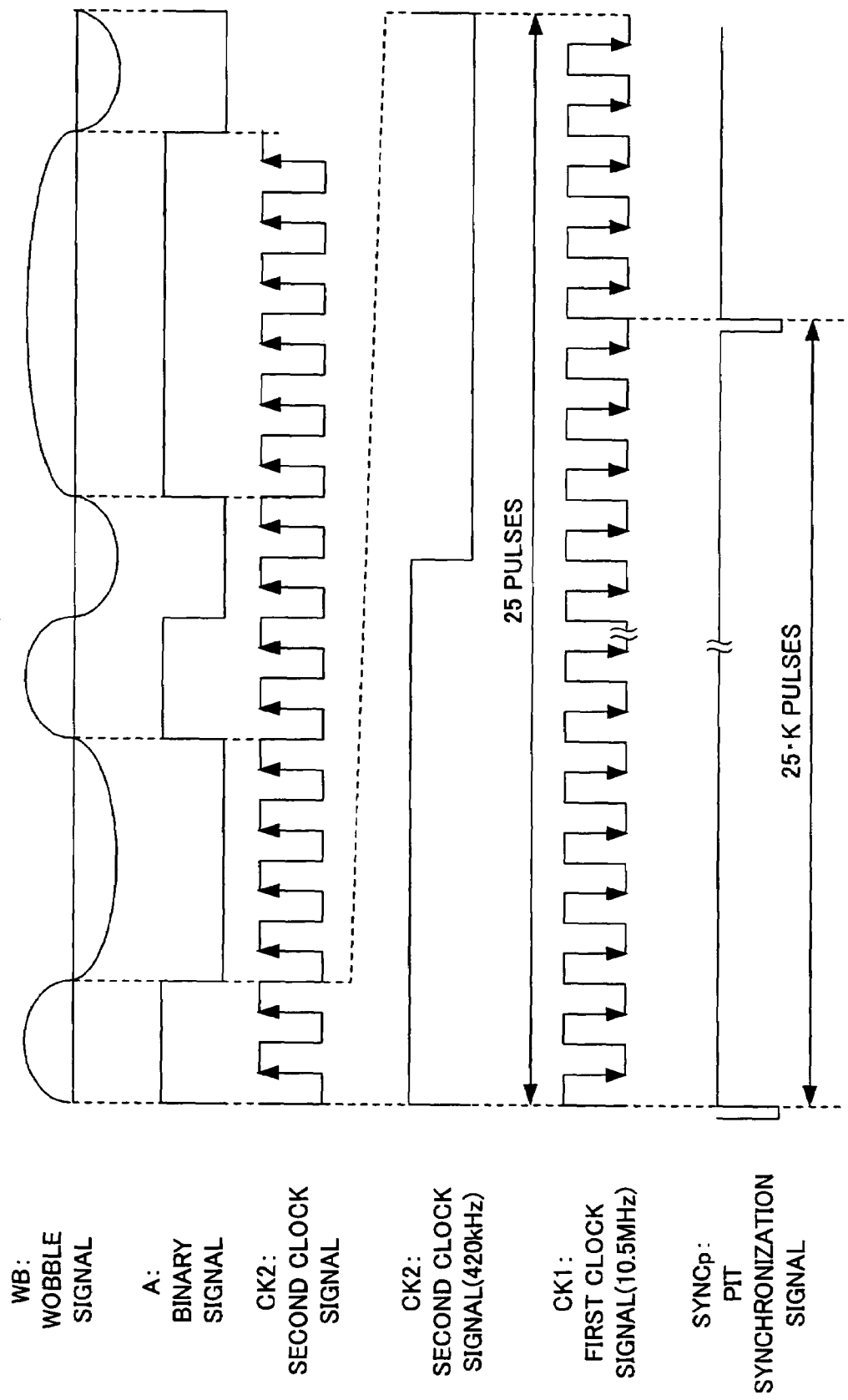
FIG. 6 is a timing chart of a wobble signal WB, a binary signal A, a first clock signal CK1, a second clock signal CK2, and a pit synchronization signal SYNCp.

FIG. 6 shows a timing chart of the wobble signal WB, a binary signal A, the first clock signal CK1, the second clock signal CK2, and the pit synchronization signal SYNCp. A comparator 224 outputs the binary signal A obtained by binarizing the wobble signal WB. Since the wobble signal WB has a low frequency, the inclination thereof near zero crossing is relatively mild. Thus, the binary signal A has a large jitter component. A sampling circuit 225 samples the binary signal A by using the second clock signal CK2 and extracts the data, to thereby reproduce the spread spectrum data SS.

In the first embodiment, the frequency f1 of the first clock signal CK1 is 10.5 MHz and the frequency f2 of the second clock signal CK2 is 420 KHz. Thus, a division circuit 226 generates the second clock signal CK2 by frequency-dividing the first clock signal CK1 by 25. Therefore, as shown in FIG. 6, one cycle of the second clock signal CK2 can contain therein 25 first clock signals CK1. The division circuit 226 is set to be reset if the voltage of a reset terminal R is active (at a low level), and the pit synchronization signal SYNCp is supplied to the reset terminal R. Therefore, the second clock signal CK2 is reset by the trailing of the pit synchronization signal SYNCp, and its phase is determined from the pit synchronization signal SYNCp.

The synchronization patterns are inserted in the pit data DP with a cycle of 25×K (K: natural number) bits, and each has such a relationship that the beginning of the synchronization pattern agrees with the leading or rising edge of the second clock signal CK2. Namely, the synchronization pattern has a frequency which is a natural multiple of that of the second clock signal CK2. In this case, if the pit synchronization signal SYNC becomes active at the timing shown in FIG. 6, the division circuit 226 is reset and the phases of the pit synchronization signal SYNCp and the second clock signal CK2 are adjusted. This makes it possible to adjust the occurrence timing of the leading edge of the second clock signal CK2 by using the first clock signal CK1 with a higher frequency. Therefore, even if the edge of the binary signal A is influenced and wobbled by jitter, it is possible to certainly extract the spread spectrum data SS.

Back in FIG. 4, the explanation goes on. A random pattern used for the spread spectrum modulation upon recording is stored on a RAND table 227. The random pattern corresponds to a spread code and is a bit row generated by using a random function. The second clock signal CK2 is supplied to the RAND table 227. By reading the random pattern in synchronization with the second clock signal CK2, the random data RND is generated. The generated random data RND is supplied to a spread spectrum demodulation circuit 228. Moreover, the spread spectrum data SS outputted from the sampling circuit 225 is supplied to the spread spectrum demodulation circuit 228. The spread spectrum data SS is multiplied with the random data RND, thereby to reproduce the wobble data DW. In this case, a signal which is not in an original signal band is converted into a signal which is out of the band by the multiplication. Incidentally, the comparator 224, the sampling circuit 225, the division circuit 226, the RAND table 227, and the spread spectrum demodulation circuit 228 constitute the above-described "second data reproducing device".

The pit synchronization signal SYNCp outputted from the pit data demodulation circuit 211 is supplied to a wobble data reproduction circuit 229. The wobble data reproduction circuit 229 corresponds to the above-described "synchronization signal removing device". The wobble data reproduction circuit 229 removes the first wobble synchronization signal SYNCw and the second wobble synchronization signal D-SYNCw from the wobble data DW on the basis of a timing at which the pit synchronization signal SYNCp is supplied.

The wobble data DW in which the synchronization signal is removed in this manner is error-corrected on an error correction circuit 230.

As described above, on the information reproducing apparatus 200, it is possible to easily reproduce the wobble data DW by that the wobble data reproduction circuit 229 detects the first wobble synchronization signal SYNCw from the wobble data DW on the basis of the pit synchronization signal SYNCp. On the other hand, even if illegal copy vendors who do not know about the regular or constant cycle of the first wobble synchronization signal SYNCw try to reproduce the wobble data DW from the optical disc 1, they have difficulty in judging which is a true synchronization signal, the first wobble synchronization signal SYNCw or the second wobble synchronization signal D-SYNCw. Therefore, according to the first embodiment, it is possible to improve the concealment of the wobble data DW.

2. Second Embodiment

<2-1: Basic Structure of Optical Disc>

In the second embodiment, as with the structure of the optical disc 1 shown in FIG. 1, the pit data DP is recorded according to the length of the record mark on the optical disc 1. On the other hand, in addition to the pit data DP, the wobble signal WB is superposedly or redundantly recorded by the meandering or wobbling of the record mark on the optical disc 1.

Moreover, the pit data DP has the same structure as the pit data DP shown in FIG. 2, and the detailed structures of the first wobble synchronization signal SYNCw and the second wobble synchronization signal D-SYNCw which are provided for the wobble data DW are different from those of the wobble data DW shown in FIG. 2.

In the second embodiment, on the optical disc 1, the first wobble synchronization signal SYNCw is further encrypted and recorded, and the second wobble synchronization signal D-SYNCw includes information associated with the encryption of the first wobble synchronization signal SYNCw and information for indicating the recording position of the first wobble synchronization signal SYNCw.

FIG. 7 shows the data format of the second wobble synchronization signal D-SYNCw. In the second embodiment, as in the first embodiment, each of the first wobble synchronization signal SYNCw and the second wobble synchronization signal D-SYNCw is 3 bytes, i.e. 3×8 bits. On the table shown in FIG. 7, the first row shows a bit position of the second wobble synchronization signal D-SYNCw by using the bit number counted from 0 bit wherein the start position of the second wobble synchronization signal D-SYNCw is the 0 bit, and the second row shows the data content recorded at the bit position shown in the first row.

As shown in FIG. 7, with respect to the second wobble synchronization signal D-SYNCw, the synchronization pattern of the second wobble synchronization signal D-SYNCw is recorded from 0 to the 15th bit. From the 16th bit to the 17th bit, a pattern number for indicating an encryption pattern used for the encryption of the first wobble synchronization signal SYNCw is recorded. From the 18th bit to the 23rd bit, the relative recording position of the first wobble synchronization signal SYNCw, which is recorded following the second wobble synchronization signal D-SYNCw, with respect to the second wobble synchronization signal D-SYNCw is recorded. For example, if the first wobble synchronization signal SYNCw is encrypted by using a predetermined random series or a predetermined encryption table, a random series number for indicating the predetermined random series or an encryption table number for indicating the predetermined encryption table is recorded as the pattern number in the second wobble synchronization signal D-SYNCw.

In the first embodiment, the second wobble synchronization signal D-SYNCw is constructed as the same signal pattern as a signal pattern for the first wobble synchronization signal SYNCw. Thus, if illegal copy vendors assume either the first wobble synchronization signal SYNCw or the second wobble synchronization signal D-SYNCw is a true synchronization signal and try to reproduce the wobble data DW, there is a possibility to succeed in reproducing the wobble data DW.

On the other hand, according to the second embodiment, the first wobble synchronization signal SYNCw is further encrypted and recorded. Moreover, the second wobble synchronization signal D-SYNCw includes the information for indicating the recording position of the encrypted first wobble synchronization signal SYNCw and the information associated with a "key" to decrypt or decode the encryption of the first wobble synchronization signal SYNCw.

Thus, in the second embodiment, even if illegal copy vendors who do not know the above-descried rule associated with the recording of the first wobble synchronization signal SYNCw and the second wobble synchronization signal D-SYNCw can reproduce the wobble signal WB from the optical disc 1 and can obtain the second wobble synchronization signal D-SYNCw from the wobble signal WB, they have extreme difficulty in reproducing the first wobble synchronization signal SYNCw. Therefore, in the second embodiment, it is possible to dramatically improve the concealment of the wobble data DW, as compared with the first embodiment.

<2-2. Entire Structure of Mastering Apparatus>

Figure 8:
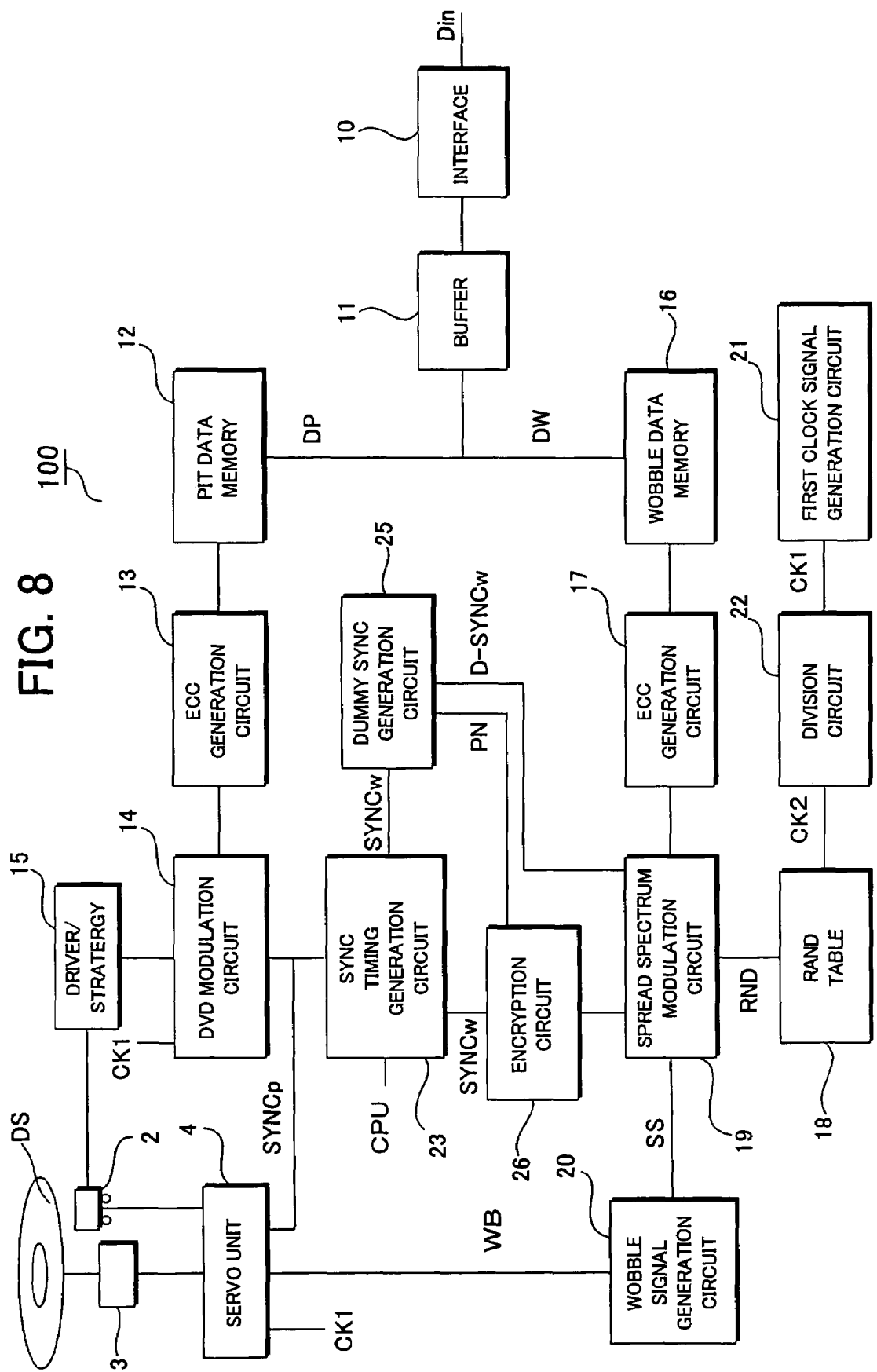
FIG. 8 is a block diagram showing the entire structure of a mastering apparatus associated with the second embodiment of the present invention.

FIG. 8 shows the entire structure of a mastering apparatus in the second embodiment. The mastering apparatus in the second embodiment has the same structure of the mastering apparatus 100 in the first embodiment shown in FIG. 3, except being provided with the detailed structure of a dummy SYNC generation circuit and an encryption circuit. Thus, only the dummy SYNC generation circuit and the encryption circuit will be explained with reference to FIG. 8 with regard to the mastering apparatus in the second embodiment.

A pattern number PN for indicating an encryption pattern used for encryption as described later is supplied to a dummy SYNC generation circuit 25. The dummy SYNC generation circuit 25 generates the second wobble synchronization signal D-SYNCw at a timing which is delayed by a random time length from a timing at which the first wobble synchronization signal SYNCw is generated. The dummy SYNC generation circuit 25 records a time relationship between the timing at which the first wobble synchronization signal SYNCw is generated and the timing at which the second wobble synchronization signal D-SYNCw is generated, into the second wobble synchronization signal D-SYNCw as information associated with the relative recording position of the first wobble synchronization signal SYNCw. Moreover, the dummy SYNC generation circuit 25 records the supplied pattern number PN into the second wobble synchronization signal D-SYNCw.

An encryption circuit 26 encrypts the first wobble synchronization signal SYNCw by using one type of encryption pattern out of a plurality of encryption patterns. The encryption circuit 26 has a memory which is not illustrated in FIG. 8, and the plurality of encryption patterns are associated with their own pattern number and stored in the memory.

The spread spectrum modulation circuit 19 appends the first wobble synchronization signal SYNCw to the wobble data DW on the basis of a timing at which the encryption circuit 26 generates the encrypted first wobble synchronization signal SYNCw.

<2-3. Information Reproducing Apparatus>

Figure 9:
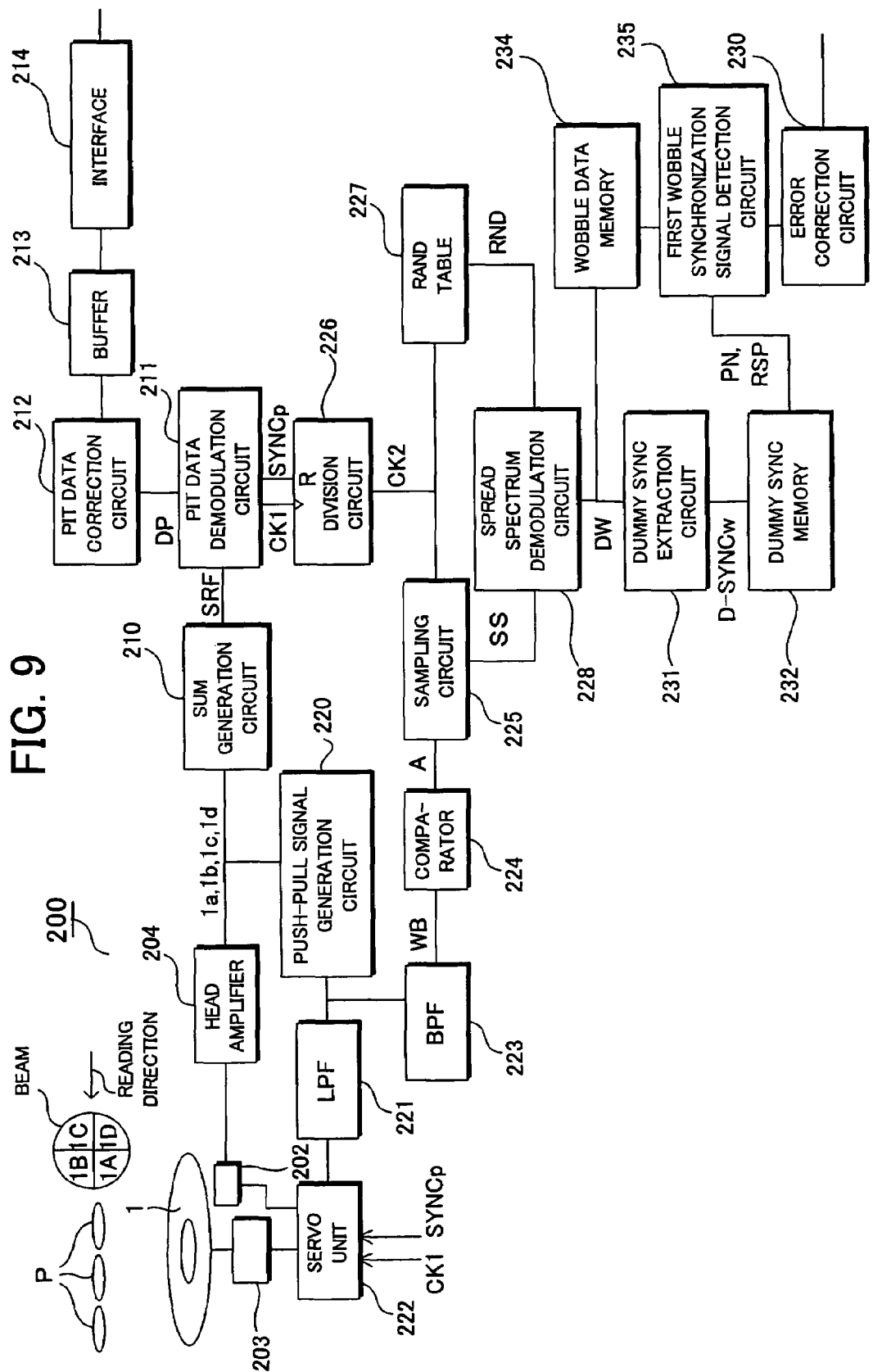
FIG. 9 is a block diagram showing the entire structure of an information reproducing apparatus associated with the second embodiment of the present invention.

FIG. 9 shows the entire structure of an information reproducing apparatus in the second embodiment. The information reproducing apparatus in the second embodiment has the same structure as that of the information reproducing apparatus 200 in the first embodiment shown in FIG. 4 except being further provided with: a dummy SYNC extraction circuit; a dummy SYNC memory; a wobble data memory; and a first wobble synchronization signal detection circuit. Thus, only a difference from the information reproducing apparatus 200 in the first embodiment will be explained with reference to FIG. 9 with regard to the information reproducing apparatus in the second embodiment.

A dummy SYNC extraction circuit 231 sequentially extracts the second wobble synchronization signal D-SYNCw from the wobble data DW generated by the spread spectrum demodulation circuit 228. Incidentally, the dummy SYNC extraction circuit 231 corresponds to the above-described "second synchronization signal detecting device".

The second wobble synchronization signal D-SYNCw is stored into a dummy SYNC memory 232 according to the order of the extraction by the dummy SYNC extraction circuit 231. Moreover, the wobble data DW generated by the spread spectrum demodulation circuit 228 is stored into a wobble data memory 234.

A first wobble synchronization signal detection circuit 235 corresponds to the above-described "synchronization signal removing device" and "first synchronization signal detecting device", and reads the wobble data DW from the wobble data memory 234. The first wobble synchronization signal detection circuit 235 reads the pattern number PN and information RSP associated with the recording position of the first wobble synchronization signal SYNCw for each second wobble synchronization signal D-SYNCw, from a dummy SYNC memory 232, according to the storage order of the second wobble synchronization signal D-SYNCw.

Then, the first wobble synchronization signal detection circuit 235 performs decryption with respect to the data specified by the information RSP associated with the recording position of the read first wobble synchronization signal SYNCw out of the read wobble data DW, on the basis of the corresponding pattern number PN. The first wobble synchronization signal detection circuit 235 is provided with a memory which is not illustrated in FIG. 9, and an encryption pattern used for the encryption of the first wobble synchronization signal SYNCw upon recording is associated with the pattern number and stored in the memory. The first wobble synchronization signal detection circuit 235 performs the decryption by reading the encryption pattern corresponding to the pattern number PN from the memory and using the read encryption pattern.

The first wobble synchronization signal detection circuit 235 detects the first wobble synchronization signal SYNCw from the decrypted data as a result of the decryption. Then, it removes the first wobble synchronization signal SYNCw and the second wobble synchronization signal D-SYNCw from the wobble data DW on the basis of the detected first wobble synchronization signal SYNCw.

The actual data in which the synchronization signal is removed in this manner is error-corrected on the error correction circuit 230.

As described above, on the information reproducing apparatus 200 in the second embodiment, it is possible to easily detect the first wobble synchronization signal SYNCw by detecting the second wobble synchronization signal D-SYNCw from the wobble data DW and by using the pattern number PN and the information RSP associated with the recording position of the first wobble synchronization signal SYNCw included in the second wobble synchronization signal D-SYNCw. Thus, according to the second embodiment, it is possible to easily reproduce the actual data from the wobble data DW on the basis of the detected first wobble synchronization signal SYNCw.

On the other hand, even if illegal copy vendors who do not know the rule associated with the recording of the first wobble synchronization signal SYNCw and the second wobble synchronization signal D-SYNCw in the second embodiment can reproduce the wobble signal WB from the optical disc 1 and can obtain the second wobble synchronization signal D-SYNCw from the wobble signal WB, they have extreme difficulty in reproducing the first wobble synchronization signal SYNCw. As a result, in the second embodiment, it is possible to dramatically improve the concealment of the wobble data DW, as compared with the first embodiment.

3. Third Embodiment

<3-1: Basic Structure of Optical Disc>

In the third embodiment, as with the structure of the optical disc 1 shown in FIG. 1, the pit data DP is recorded according to the length of the record mark on the optical disc 1. On the other hand, in addition to the pit data DP, the wobble signal WB is superposedly or redundantly recorded by the meandering or wobbling of the record mark on the optical disc 1.

Figure 10:
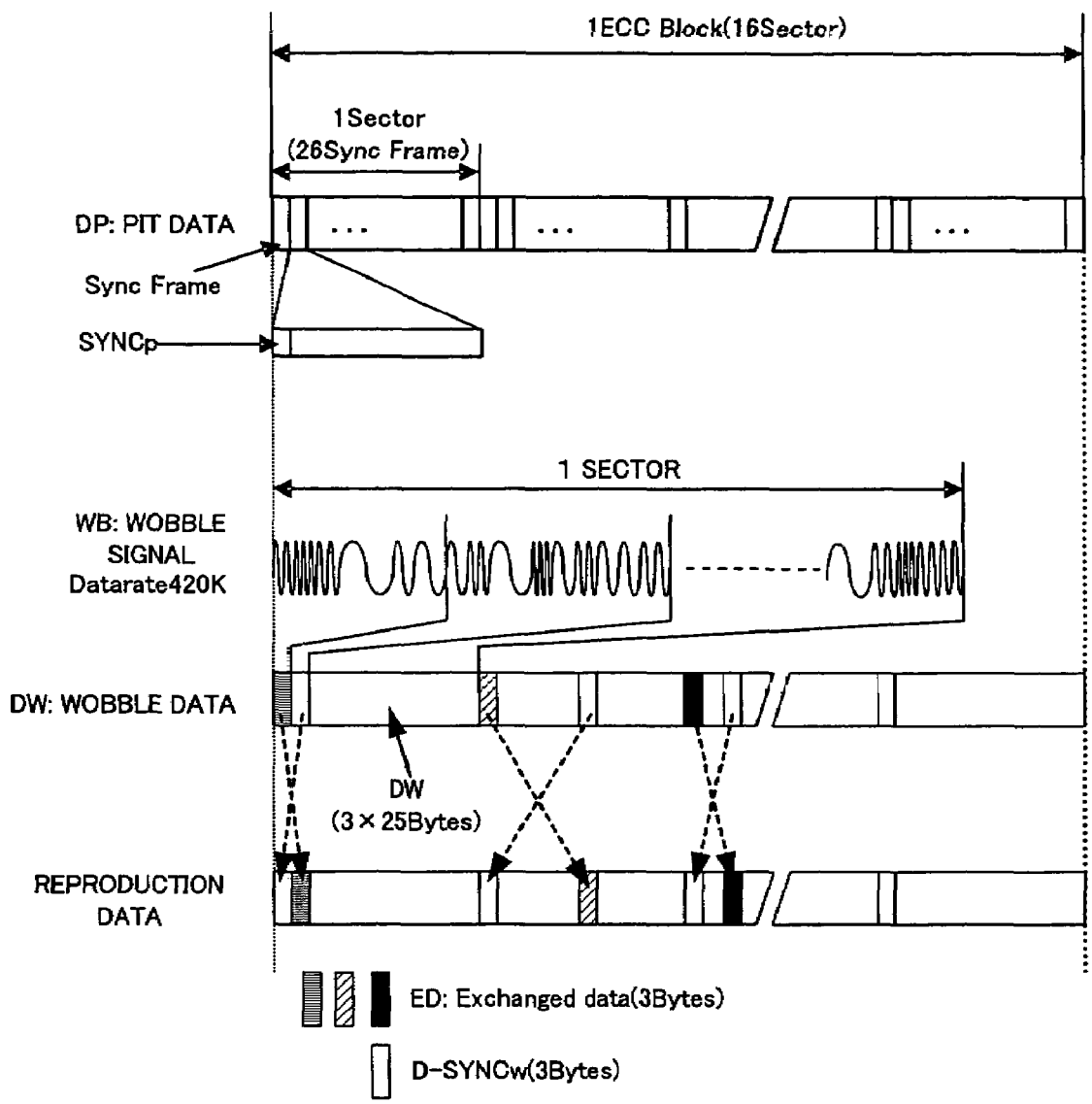
FIG. 10A is an explanatory diagram showing the data formats of pit data DP and wobble data DW associated with a third embodiment of the present invention.
FIG. 10B is an explanatory diagram showing the data format of a second wobble synchronization signal associated with the third embodiment of the present invention.

FIG. 10A shows the data formats of pit data DP and wobble data DW. FIG. 10B shows a table for indicating the data format of the second wobble synchronization signal D-SYNCw.

In the third embodiment, the pit data DP has the same structure as the pit data DP shown in FIG. 2. On the other hand, the wobble data DW has a different format from the format in the first embodiment shown in FIG. 2.

As shown in FIG. 10A, in the third embodiment, 3 bytes of data out of one sector of the wobble data DW which is 3×25 bytes is regarded as the second wobble synchronization signal D-SYNCw, and the recording position of the second wobble synchronization signal D-SYNCw and the recording position of predetermined 3 byte data in the wobble data DW (referred to as "Exchanged Data ED" hereinafter) are replaced and recorded. Thus, in the third embodiment, the second wobble synchronization signal D-SYNCw, which is a dummy synchronization signal, is recorded away from the start position (the head of the sector) of the wobble data DW.

FIG. 10B shows the data format of the second wobble synchronization signal D-SYNCw. The first row shows a bit position of the second wobble synchronization signal D-SYNCw by using the bit number counted from 0 bit wherein the start position of the second wobble synchronization signal D-SYNCw is the 0 bit, and the second row shows the data content recorded at the bit position shown in the first row.

As shown in FIG. 10B, with respect to the second wobble synchronization signal D-SYNCw, the synchronization pattern of the second wobble synchronization signal D-SYNCw is recorded from 0 to the 15th bit. From the 16th bit to the 23rd bit, position information for indicating the relative recording position between the second wobble synchronization signal D-SYNCw and the replaced exchanged data ED, i.e. the recording position of the exchanged data ED to be originally placed at a position at which the second wobble synchronization signal D-SYNCw is placed, is recorded.

Thus, upon reproducing the optical disc 1, even if the second wobble synchronization signal D-SYNCw can be obtained from the wobble signal WB reproduced from the optical disc 1, it is impossible to replace the second wobble synchronization signal D-SYNCw and the exchanged data ED without understanding the data structure of the second wobble synchronization signal D-SYNCw and it is impossible to reproduce the wobble data DW. Therefore, illegal copy vendors who do not know the rule associated with the recording of the second wobble synchronization signal D-SYNCw, as described above, have extreme difficulty in reproducing the wobble data DW. As a result, in the third embodiment, it is possible to dramatically improve the concealment of the wobble data DW.

<3-2. Entire Structure of Mastering Apparatus>

Figure 11:
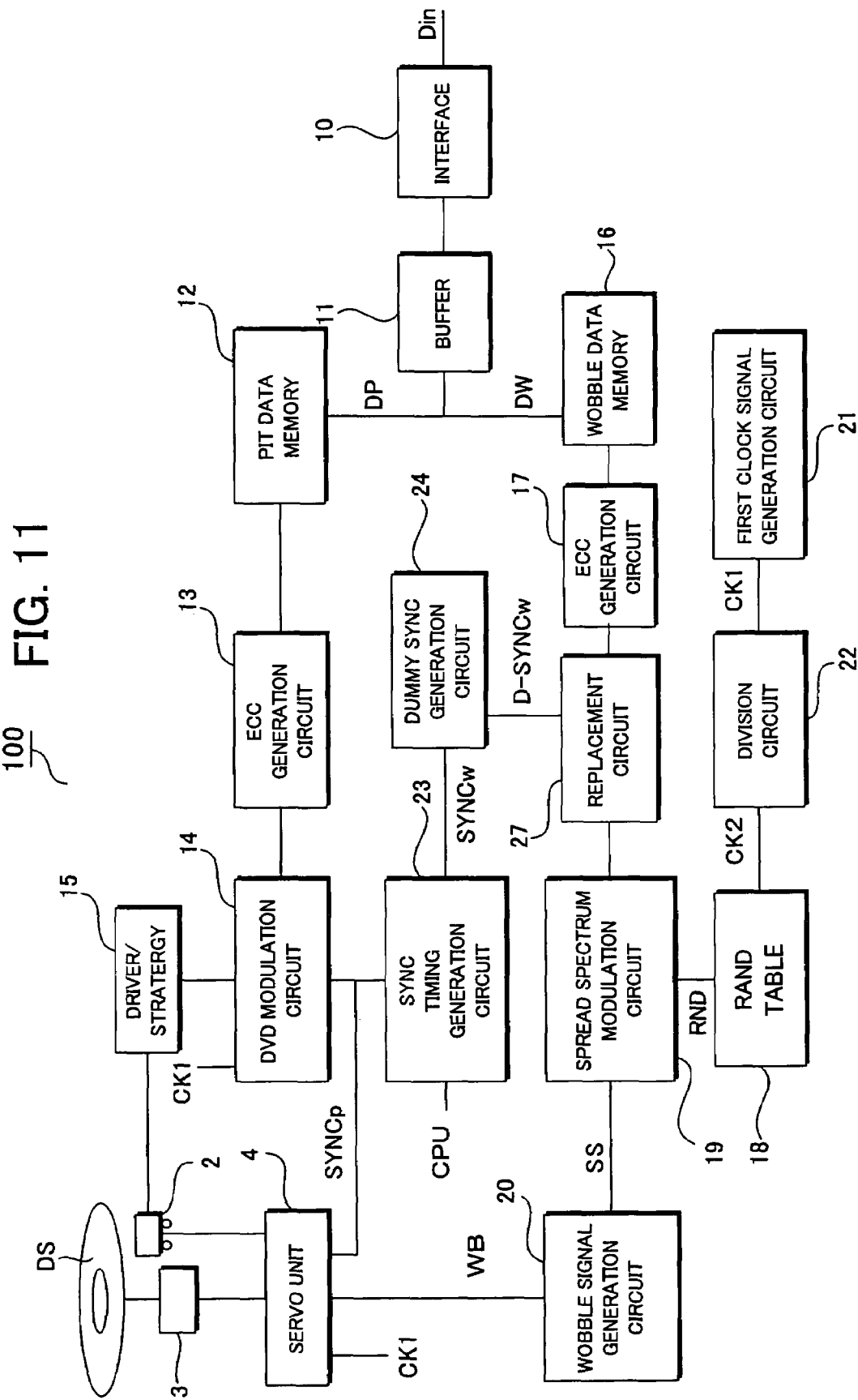
FIG. 11 is a block diagram showing the entire structure of a mastering apparatus associated with the third embodiment of the present invention.

FIG. 11 shows the entire structure of a mastering apparatus in the third embodiment. The mastering apparatus in the third embodiment has the same structure of the mastering apparatus 100 in the first embodiment shown in FIG. 3, except being provided with a replacement circuit 27 between the ECC circuit 17 and the spread spectrum modulation circuit 19.

In the third embodiment, the SYNC timing generation circuit 23 supplies the first wobble synchronization signal SYNCw to the replacement circuit 27. The first wobble synchronization signal SYNCw is outputted at a start timing of the wobble data DW. Namely, the first wobble synchronization signal SYNCw is outputted at the head of each synchronization frame. The first wobble synchronization signal SYNCw is outputted by the dummy SYNC generation circuit 24 as the second wobble synchronization signal D-SYNCw which includes the position information for indicating the relative recording position with the exchanged data ED in addition to the synchronization pattern, as described above. Incidentally, the relative recording position with the exchanged data ED may be changed randomly for each synchronization frame. Alternatively, it may be randomly changed at a predetermined timing, such as at the start of recording or at a timing of switching on, to always keep the same value during recording.

The replacement circuit 27 refers to the information for indicating the relative recording position with the exchanged data ED included in the second wobble synchronization signal D-SYNCw, specifies the exchanged data ED from the wobble data DW, and replaces the recording positions of the specified exchanged data ED and the second wobble synchronization signal D-SYNCw. The wobble data DW in which the recording positions are replaced in this manner is spread-spectrum-modulated, and is further converted into the wobble signal WB, and is recorded onto the master disc DS. On the optical disc 1 produced by using the master disc DS, the second wobble synchronization signal D-SYNCw is recorded away from the start position of the wobble data DW, and the recording positions of the second wobble synchronization signal D-SYNCw and the exchanged data ED are replaced. Namely, by deviating the recording position of the second wobble synchronization signal D-SYNCw from a normal position, scrambling is performed to the wobble data DW. Thus, even if illegal copy vendors succeed in detecting the synchronization pattern, they cannot accurately reproduce the wobble data DW unless they know a replacement rule, so that it is possible to dramatically improve the concealment of the wobble data DW.

<3-3. Information Reproducing Apparatus>

Figure 12:
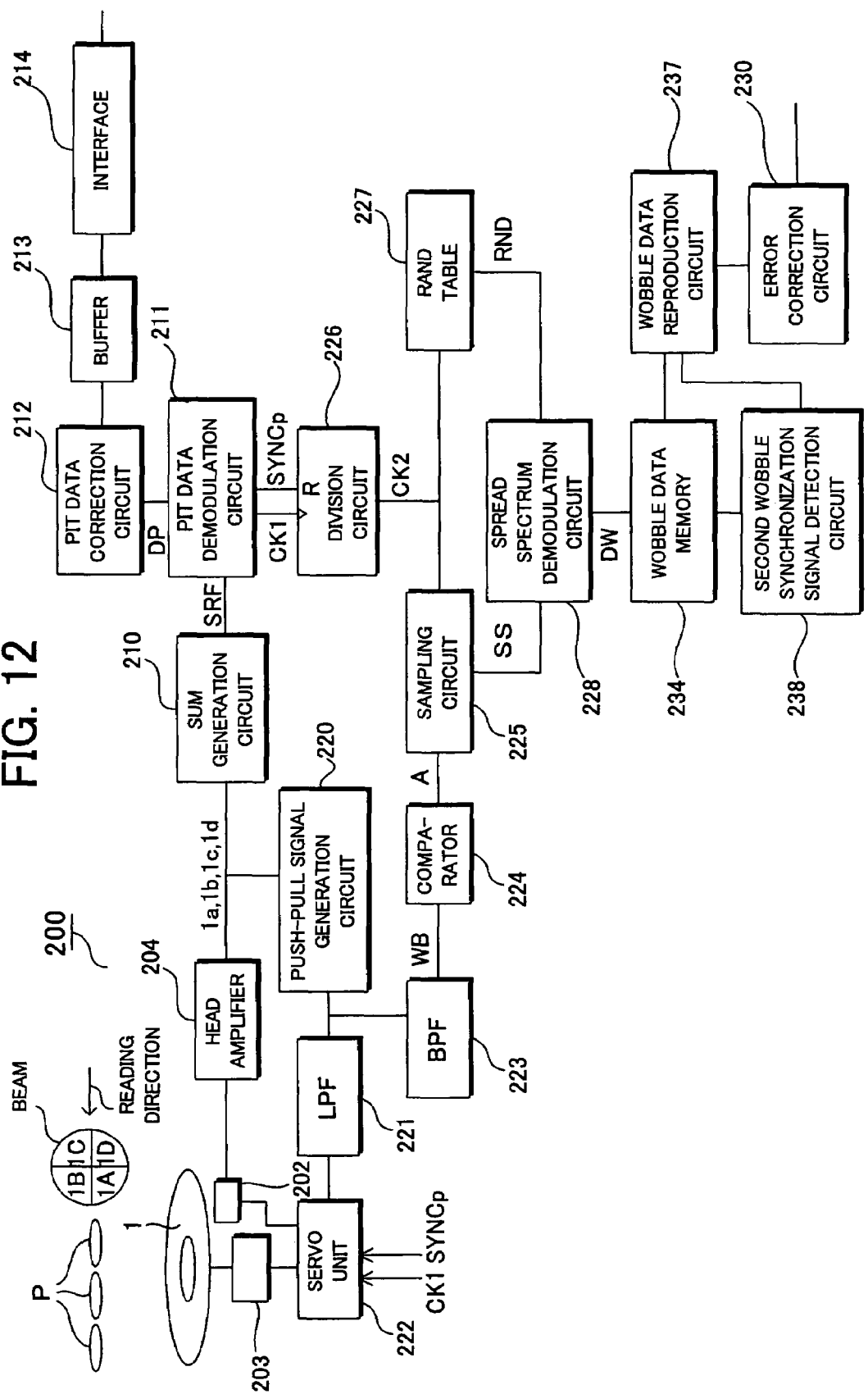
FIG. 12 is a block diagram showing the entire structure of an information reproducing apparatus associated with the third embodiment of the present invention.

FIG. 12 shows the entire structure of an information reproducing apparatus in the third embodiment. The information reproducing apparatus in the third embodiment has the same structure as that of the information reproducing apparatus 200 shown in FIG. 4 except being further provided with: the wobble data memory 234; and a second wobble synchronization signal detection circuit 238, and except the detailed structure of a wobble data reproduction circuit 237.

The wobble data DW generated by the spread spectrum demodulation circuit 228 is stored into the wobble data memory 234. The second wobble synchronization signal detection circuit 238 detects the second wobble synchronization signal D-SYNCw from the wobble data DW stored in the wobble data memory 234 and outputs, to the wobble data reproduction circuit 237, (i) address information for indicating a memory area in which the second wobble synchronization signal D-SYNCw is stored in the wobble data memory 234 and (ii) the position information for indicating the relative recording position between the second wobble synchronization signal D-SYNCw and the exchanged data ED.

The wobble data reproduction circuit 237 corresponds to the above-described "replacing device" and "synchronization signal removing device". It firstly specifies a memory area in which the exchanged data ED is stored in the wobble data memory 234, on the basis of the address information and the position information indicating the relative recording position. Secondly, it replaces the exchanged data ED read from the memory area with the second wobble synchronization signal D-SYNCw read from the memory area indicated by the address information, and reproduces the wobble data DW with the scrambling canceled. This causes the second wobble synchronization signal D-SYNCw to be placed at the head of each synchronization frame and the exchanged data ED to be returned to a normal position, as shown in FIG. 10A. Thirdly, the wobble data reproduction circuit 237 generates a wobble data read clock on the basis of the second wobble synchronization signals D-SYNCw which are located at constant intervals, and removes the second wobble synchronization signals D-SYNCw from the reproduced wobble data DW. The reproduction data in which the synchronization signal is removed in this manner is supplied to the error correction circuit 230, error-corrected, and outputted to external equipment.

According to the information reproducing apparatus in the third embodiment, the exchanged data ED is returned to an accurate position by referring to the position information for indicating the relative recording position between the second wobble synchronization signal D-SYNCw and the exchanged data ED included in the second wobble synchronization signal D-SYNCw, so that it is possible to accurately reproduce the wobble data DW.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-197094 filed on Jul. 15, 2003 including the specification, claims, drawings and summary is incorporated herein by reference in its entirety.

What is claimed is:

1. An information recording medium on which a record mark, which is a pit, having a variable length according to first data is formed at a displaced position to which the record mark is displaced, in a direction crossing a reading direction of the record mark, according to a signal obtained by modulating second data in a predetermined modulating method, wherein
   a first synchronization signal is recorded at a predetermined position of the second data,
   a second synchronization signal as a dummy is recorded away from the predetermined position of the second data,
   a synchronization signal of the first data is recorded in the first data,
   the first synchronization signal is synchronized with the synchronization signal of the first data,
   the second synchronization signal is asynchronous with the synchronization signal of the first data, and
   the predetermined modulating method is a spread spectrum modulating method.

2. The information recording medium according to claim 1, wherein
   the first synchronization signal is encrypted and recorded, and
   the second synchronization signal includes (i) first information associated with an encryption of the first synchronization signal and (ii) second information for indicating a recording position of the first synchronization signal.

3. The information recording medium according to claim 2, wherein
   the first synchronization signal is encrypted by using a predetermined random series or a predetermined encryption table, and
   the first information associated with the encryption is a random series number for indicating the predetermined random series or an encryption table number for indicating the predetermined encryption table.

4. The information recording medium according to claim 1, wherein the second synchronization signal includes position information for indicating a recording position of one portion of the second data to be placed at a position at which the synchronization signal is placed.

5. An information reproducing apparatus for reproducing information recorded on an information recording medium, on which a record mark, which is a pit, having a variable length according to first data is formed at a displaced position to which the record mark is displaced, in a direction crossing a reading direction of the record mark, according to a signal obtained by modulating second data in a predetermined modulating method, wherein a first synchronization signal is recorded at a predetermined position of the second data and a second synchronization signal as a dummy is recorded away from the predetermined position of the second data, a synchronization signal of the first data is recorded in the first data, the first synchronization signal is synchronized with the synchronization signal of the first data, the second synchronization signal is asynchronous with the synchronization signal of the first data, and the predetermined modulating method is a spread spectrum modulating method,
   said information reproducing apparatus comprising:
   a reading device for reading the record mark recorded on said information recording medium;
   a wobble signal generating device for generating a wobble signal for indicating the displaced position of the record mark on the basis of an output signal from said reading device;
   a second data reproducing device for reproducing the second data from the generated wobble signal; and
   a synchronization signal removing device for removing the second synchronization signal from the reproduced second data.

6. The information reproducing apparatus according to claim 5, wherein
   the first synchronization signal which is synchronized with the synchronization signal of the first data and which is encrypted is recorded at a predetermined position of the second data on said information recording medium, and the second synchronization signal includes (i) first information associated with an encryption of the first synchronization signal and (ii) second information for indicating a recording position of the first synchronization signal, and
   said information recording apparatus further comprises:
   a second synchronization signal detecting device for detecting the second synchronization signal from the reproduced second data; and
   a first synchronization signal detecting device for extracting the first information and the second information from the detected second synchronization signal, separating the encrypted first synchronization signal included in the second data on the basis of the extracted second information, and decrypting the encrypted first synchronization signal by using the first information, to thereby detect the first synchronization signal.

7. The information reproducing apparatus according to claim 5, wherein
   the second synchronization signal includes position information for indicating a recording position of one portion of the second data to be placed at a position at which the synchronization signal is placed, and
   said information reproducing apparatus further comprises:
   a replacing device for returning the second data to a normal position on the basis of the position information.

8. An information reproducing method of reproducing information recorded on an information recording medium, on which a record mark, which is a pit, having a variable length according to first data is formed at a displaced position to which the record mark is displaced, in a direction crossing a reading direction of the record mark, according to a signal obtained by modulating second data in a predetermined modulating method, wherein a first synchronization signal is recorded at a predetermined position of the second data and a second synchronization signal as a dummy is recorded away from the predetermined position of the second data, a synchronization signal of the first data is recorded in the first data, the first synchronization signal is synchronized with the synchronization signal of the first data, the second synchronization signal is asynchronous with the synchronization signal of the first data, and the predetermined modulating method is a spread spectrum modulating method,
   said information reproducing method comprising:
   a reading process of reading the record mark recorded on said information recording medium;
   a wobble signal generating process of generating a wobble signal for indicating the displaced position of the record mark on the basis of an output signal in said reading process;
   a second data reproducing process of reproducing the second data from the generated wobble signal; and
   a synchronization signal removing process of removing the second synchronization signal from the reproduced second data.

* * * * *